(12) United States Patent
Yu et al.

(10) Patent No.: US 11,387,869 B2
(45) Date of Patent: Jul. 12, 2022

(54) ANTENNA SHARING SYSTEM AND TERMINAL

(71) Applicant: SPREADTRUM COMMUNICATIONS (SHANGHAI) CO., LTD., Shanghai (CN)

(72) Inventors: Chinghwa Yu, Shanghai (CN); Long Wang, Shanghai (CN); Jiewei Lai, Shanghai (CN); Yexin Peng, Shanghai (CN); Yan Zhang, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 16/982,836

(22) PCT Filed: Apr. 23, 2019

(86) PCT No.: PCT/CN2019/083828
§ 371 (c)(1),
(2) Date: Sep. 21, 2020

(87) PCT Pub. No.: WO2020/073636
PCT Pub. Date: Apr. 16, 2020

(65) Prior Publication Data
US 2021/0058115 A1 Feb. 25, 2021

(30) Foreign Application Priority Data
Oct. 11, 2018 (CN) .............................. 201811184301

(51) Int. Cl.
*H04B 7/0404* (2017.01)
*H04W 84/12* (2009.01)

(52) U.S. Cl.
CPC ........... *H04B 7/0404* (2013.01); *H04W 84/12* (2013.01)

(58) Field of Classification Search
CPC ..... H04W 16/14; H04W 88/06; H04W 84/12; H04W 52/0251
See application file for complete search history.

(56) References Cited

U.S. PATENT DOCUMENTS 8,321,489 B2   11/2012  Staszewski et al.
9,401,798 B1 *  7/2016  Signoff ................ H04B 1/0057
(Continued)

FOREIGN PATENT DOCUMENTS

CN   101557237 A   10/2009
CN   102111176 A    6/2011
(Continued)

OTHER PUBLICATIONS

International Search Report for International Application No. PCT/CN2019/083828; dated May 29, 2019.
(Continued)

*Primary Examiner* — Romani Ohri
(74) *Attorney, Agent, or Firm* — Cantor Colburn LLP

(57) ABSTRACT

An antenna sharing system and a terminal. The antenna sharing system comprises a communication module, and the communication module supports 5 GHz Wi-Fi and LTE. The antenna sharing system further comprises a first antenna and a first multiplexer; the first multiplexer at least comprises two multiplex input ends and a multiplex output end, a first multiplex input end of the first multiplexer is used for receiving and transmitting 5 GHz Wi-Fi secondary signals, a second multiplex input end of the first multiplexer is used for receiving and transmitting LTE secondary signals, and the multiplex output end of the first multiplexer is connected to the first antenna. The solution of the present invention can effectively improve the antenna utilization, and reduce the influences on data throughput of Wi-Fi and LTE while reducing the number of antennas.

16 Claims, 7 Drawing Sheets

(56) References Cited

U.S. PATENT DOCUMENTS

| | | | |
|---|---|---|---|
| 2011/0159823 A1 | 6/2011 | Lo et al. | |
| 2012/0282875 A1* | 11/2012 | Park | H04W 4/90 |
| | | | 455/404.1 |
| 2018/0199148 A1 | 7/2018 | Park et al. | |
| 2018/0323947 A1* | 11/2018 | Brunel | H04L 27/2605 |
| 2019/0069295 A1* | 2/2019 | Ahn | H04W 72/0453 |
| 2020/0079475 A1* | 3/2020 | Wienders | H01Q 9/0407 |

FOREIGN PATENT DOCUMENTS

| | | |
|---|---|---|
| CN | 202259659 U | 5/2012 |
| CN | 103338054 A | 10/2013 |
| CN | 104427656 A | 3/2015 |
| CN | 205453686 U | 8/2016 |
| CN | 106487491 A | 3/2017 |
| CN | 108282193 A | 7/2018 |
| CN | 109450496 A | 3/2019 |
| EP | 2672630 A1 | 12/2013 |

OTHER PUBLICATIONS

Ming et al., Design of a WiFi/GPS/BT triple-mode FEM based on LTCC Technology, Electronic Compontents and Materials, vol. 33 No. 8, Aug. 2014, pp. 89-92 (with English abstract).
CNIPA 4th Office Action for corresponding CN Application No. 201811184301.9, dated Jan. 27, 2021.

\* cited by examiner

ANTENNA SHARING SYSTEM AND TERMINAL

CROSS-REFERENCE TO RELATED APPLICATIONS

This is the U.S. national stage of application No. PCT/CN2019/083828, filed on Apr. 23, 2019, Priority ubder 35 U.S.C. § 119(a) and 35 U.S.C. § 365(b) is claimed from Chinese Patent Application No. 201811184301.9, filed Oct. 11, 2018, and entitled "ANTENNA SHARING SYSTEM AND TERMINAL", the entire disclosure of which is also incorporated herein by reference.

TECHNICAL FIELD

The present disclosure generally relates to network transmission field, and more particularly, to an antenna sharing system and a terminal.

BACKGROUND

In existing techniques, 2.4 GHz Wireless Local Area Network (WLAN) function (also known as 2.4 GHz Wireless Fidelity (Wi-Fi)), 5 GHz Wi-Fi function, Bluetooth (BT) function, Long Term Evolution (LTE) function and Global Navigation Satellite System (GNSS) function are widely integrated and used in mobile phones, tablets and other terminals.

Due to a limited space for antennas in a terminal, an antenna sharing function is usually set in the terminal. For example, one antenna is used to transmit and receive 5 GHz Wi-Fi primary signals and 2.4 GHz Wi-Fi primary signals, and another antenna is used to transmit and receive 5 GHz Wi-Fi secondary signals and 2.4 GHz Wi-Fi secondary signals In existing antenna sharing techniques, a time division mechanism is usually adopted, that is, a gating switch is set between a communication module and antennas. When 5 GHz Wi-Fi signals need to be transmitted, the gating switch is used to switch the antennas to transmit and receive 5 GHz Wi-Fi primary and secondary signals on the communication module. When 2.4 GHz Wi-Fi signals need to be transmitted, the gating switch is used to switch the antennas to transmit and receive 2.4 GHz Wi-Fi primary and secondary signals on the communication module. However, the time division mechanism may seriously affect data throughput of Wi-Fi and LTE.

A new antenna sharing system is needed to reduce the number of antennas and impact on the data throughput of Wi-Fi and LTE.

SUMMARY

Embodiments of the present disclosure provide an antenna sharing system and a terminal, to effectively improve a utilization rate of antennas and reduce the number of antennas and impact on data throughput of Wi-Fi and LTE.

Embodiments of the present disclosure provide an antenna sharing system including a communication module that supports 5 GHz Wi-Fi and LTE, and the antenna sharing system further includes: a first antenna; and a first multiplexer including at least two multiplex input terminals and a multiplex output terminal, wherein a first multiplex input terminal of the first multiplexer is configured to transmit and receive 5 GHz Wi-Fi secondary signals, a second multiplex input terminal of the first multiplexer is configured to transmit and receive LTE secondary signals, and the multiplex output terminal of the first multiplexer is connected to the first antenna.

Optionally, the communication module further supports 2.4 GHz Wi-Fi, and the antenna sharing system further includes a second antenna configured to transmit and receive 5 GHz Wi-Fi primary signals and 2.4 GHz Wi-Fi primary signals.

Optionally, the communication module further supports BT, and the antenna sharing system further includes a third antenna configured to transmit and receive at least 2.4 GHz Wi-Fi primary signals and BT signals.

Optionally, the communication module further supports GNSS, and the antenna sharing system further includes a fourth antenna configured to transmit and receive GNSS signals.

Optionally, the communication module further supports GNSS, and the third antenna is further configured to transmit and receive GNSS signals, and the antenna sharing system further includes a second multiplexer including at least two multiplex input terminals and a multiplex output terminal, wherein a first multiplex input terminal of the second multiplexer is configured to transmit and receive GNSS signals, a second multiplex input terminal of the second multiplexer is configured to transmit and receive 2.4 GHz Wi-Fi secondary signals and BT signals, and the multiplex output terminal of the second multiplexer is connected to the third antenna.

Optionally, the communication module further supports BT, and the first multiplexer further includes a third multiplex input terminal configured to transmit and receive 2.4 GHz Wi-Fi secondary signals and BT signals.

Optionally, the communication module further supports GNSS, and the antenna sharing system further includes a fourth antenna configured to transmit and receive GNSS signals.

Optionally, the communication module further supports BT and GNSS, the antenna sharing system further includes: a fourth antenna; a first gating switch including a gating input terminal and at least two gating output terminals, wherein the gating input terminal of the first gating switch is connected to a pin for the 2.4 GHz Wi-Fi secondary signals and BT signals on the communication module; and a third multiplexer including at least two multiplex input terminals and a multiplex output terminal, wherein a first multiplex input terminal of the third multiplexer is connected to a first gating output terminal of the first gating switch, a second multiplex input terminal of the third multiplexer is configured to transmit and receive GNSS signals, and the multiplex output terminal of the third multiplexer is connected to the fourth antenna, and the first multiplexer further includes a fourth multiplex input terminal connected to a second gating output terminal of the first gating switch.

Optionally, the first gating switch is selected from a group consisting of a single pole double throw switch and a switcher.

Optionally, the antenna sharing system further includes a second gating switch including at least two gating input terminals and a gating output terminal, wherein a first gating input terminal of the second gating switch is connected to a pin for the 2.4 GHz Wi-Fi secondary signals and BT signals on the communication module, a second gating input terminal of the second gating switch is connected to a pin for the LTE secondary signals on the communication module, and the gating output terminal of the second gating switch is connected to the second multiplex input terminal of the first multiplexer.

Optionally, the communication module further supports GNSS, and the antenna sharing system further includes a fourth antenna configured to transmit and receive GNSS signals.

Optionally, the communication module further supports a BT High Power Mode (HPM) and GNSS, the first multiplexer further includes a fifth multiplexer input terminal configured to transmit and receive 2.4 GHz Wi-Fi secondary signals and BT HPM signals, and the antenna sharing system further includes: a fourth antenna configured to transmit and receive GNSS signals; and a fourth multiplexer including at least two multiplex input terminals and a multiplex output terminal, wherein a first multiplex input terminal of the fourth multiplexer is configured to transmit and receive BT signals, and a second multiplex input terminal of the fourth multiplexer is configured to transmit and receive GNSS signals, and the multiplex output terminal of the fourth multiplexer is connected to the fourth antenna.

Optionally, the antenna sharing system further includes: a fifth multiplexer including at least two multiplex input terminals and a multiplex output terminal, wherein a first multiplex input terminal of the fifth multiplexer is configured to transmit and receive 5 GHz Wi-Fi primary signals, a second multiplex input terminal of the fifth multiplexer is configured to transmit and receive 2.4 GHz Wi-Fi primary signals, and the multiplex output terminal of the fifth multiplexer is connected to the second antenna.

Embodiments of the present disclosure further provide a terminal including the above antenna sharing system.

Embodiments of the present disclosure may provide following advantages.

In the embodiments of the present disclosure, the antenna sharing system includes a communication module that supports 5 GHz Wi-Fi and LTE, and the antenna sharing system further includes: a first antenna; and a first multiplexer including at least two multiplex input terminals and a multiplex output terminal, wherein a first multiplex input terminal of the first multiplexer is configured to transmit and receive 5 GHz Wi-Fi secondary signals, a second multiplex input terminal of the first multiplexer is configured to transmit and receive LTE secondary signals, and the multiplex output terminal of the first multiplexer is connected to the first antenna. In the embodiments, by setting the first multiplexer, the first antenna is shared to transmit and receive 5 GHz Wi-Fi secondary signals and LTE secondary signals. Compared with the existing technique where two antennas are used to transmit and receive LTE primary signals and LTE secondary signals respectively, in the embodiments of the present disclosure, the first antenna can transmit and receive signals other than the LTE secondary signals, which may effectively improve a utilization rate of antennas. Further, a frequency band range of the 5 GHz Wi-Fi secondary signals is quite different from that of the LTE secondary signals, which is helpful to avoid interference caused by antenna sharing and improve effectiveness of signal transmission and reception.

Further, in some embodiments, the third antenna is shared to transmit and receive 2.4 GHz Wi-Fi secondary signals and BT signals. Compared with the existing technique where a separate antenna is used to transmit and receive BT signals, in the embodiments of the present disclosure, merely 5 antennas are adopted, which reduces the number of antennas.

Further, in some embodiments, the second multiplexer is set, and the third antenna is shared to transmit and receive GNSS signals, 2.4 GHz Wi-Fi secondary signals and BT signals. Compared with the existing technique where separate antennas are used to transmit and receive BT signals and GNSS signals respectively, the embodiments of the present disclosure are applicable for situations where requirements on a GNSS function are low and requirements on an LTE function are high, and in the embodiments of the present disclosure, merely 4 antennas are adopted, which further reduces the number of antennas.

Further, in some embodiments, the first multiplexer is set as a triplexer, and the first antenna is shared to transmit and receive 5 GHz Wi-Fi secondary signals, LTE secondary signals, 2.4 GHz Wi-Fi secondary signals and BT signals. Compared with the existing technique where separate antennas are used to transmit and receive 2.4 GHz Wi-Fi secondary signals and BT signals respectively, the embodiments of the present disclosure are applicable for situations where requirements on an LTE function are low and requirements on a GNSS function are high, and in the embodiments of the present disclosure, a separate antenna is adopted to transmit and receive GNSS signals, which further reduce the number of antennas.

Further, in some embodiments, the first gating switch, the third multiplexer and the first multiplexer are set as triplexers. When the first gating switch is connected to the fourth antenna, the fourth antenna is shared to transmit and receive GNSS signals, 2.4 GHz Wi-Fi secondary signals and BT signals, and when the first gating switch is connected to the fifth antenna, the fifth antenna is shared to transmit and receive 5 GHz Wi-Fi secondary signals, LTE secondary signals, 2.4 GHz Wi-Fi secondary signals and BT signals. With these embodiments, the system can flexibly become to any of the systems provided in the above embodiments, so that users can select the system based on practical requirements on GNSS and LTE functions, which is helpful to improve convenience and enhance user experience.

Further, in some embodiments, the second gating switch is set, so that the first antenna can be connected to the 2.4 GHz Wi-Fi secondary signals and BT signals, or be connected to LTE secondary signals. Compared with setting the first multiplexer as a triplexer in the above embodiments, in these embodiments, a duplexer can be used as the first multiplexer, which effectively reduces cost.

Further, in some embodiments, the communication module further supports a BT HPM function. The fourth multiplexer and the first multiplexer are set as triplexers, so that the first antenna is shared for transmitting and receiving 5 GHz Wi-Fi secondary signals, LTE secondary signals, 2.4 GHz Wi-Fi secondary signals and BT HPM signals, and the fourth antenna is shared for transmitting and receiving BT signals and GNSS signals. In this way, the BT HPM function is supported without increasing the number of antennas.

DETAILED DESCRIPTION

In existing antenna sharing techniques, due to a limited space for antennas in a terminal, a time division mechanism is usually adopted for setting an antenna sharing function in the terminal. That is, a gating switch is set between a communication module and antennas. When 5 GHz Wi-Fi signals need to be transmitted, the gating switch is used to switch the antennas to transmit and receive 5 GHz Wi-Fi primary and secondary signals on the communication module. When 2.4 GHz Wi-Fi signals need to be transmitted, the gating switch is used to switch the antennas to transmit and receive 2.4 GHz Wi-Fi primary and secondary signals on the communication module. However, the time division mechanism may seriously affect data throughput of Wi-Fi and LTE.

Figure 1:
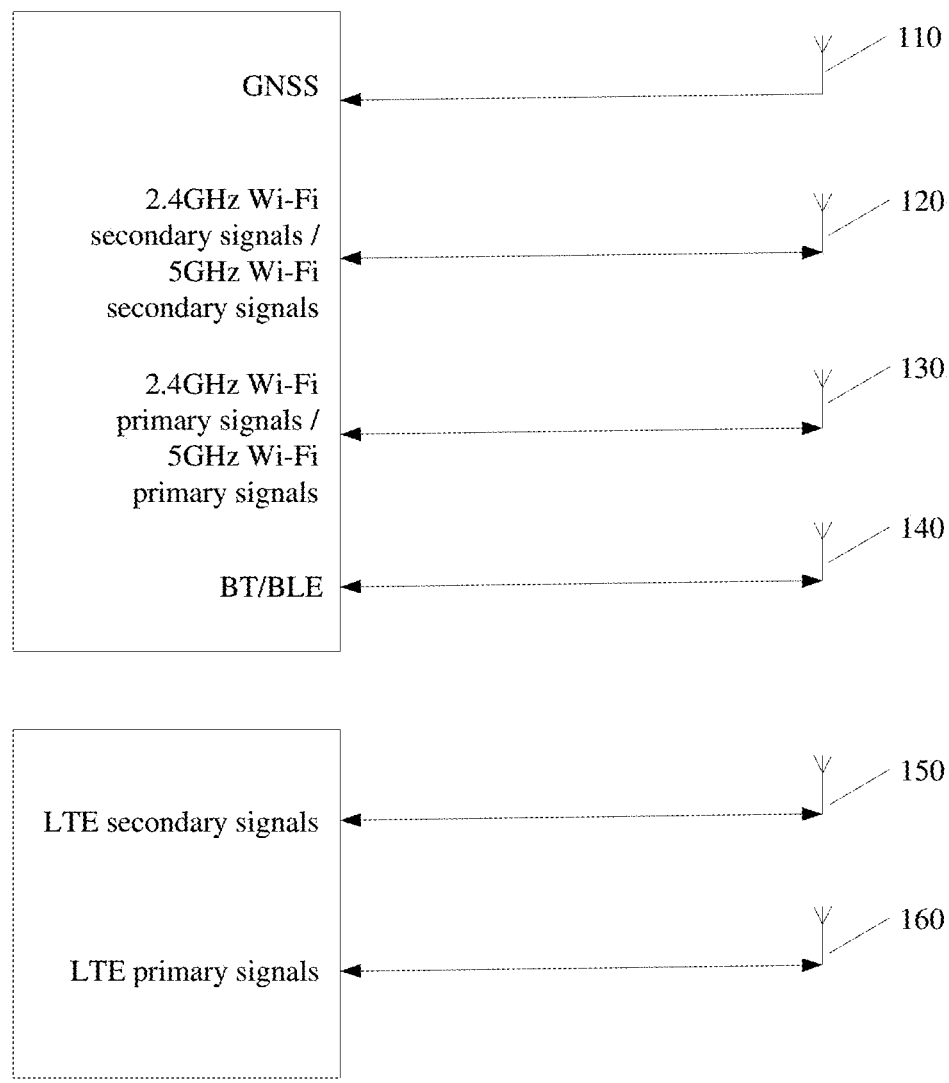
FIG. 1 is a structural diagram of an antenna sharing system in existing techniques.

FIG. 1 is a structural diagram of an antenna sharing system in existing techniques.

The antenna sharing system may include a communication module that supports 5 GHz Wi-Fi, 2.4 GHz Wi-Fi, LTE, BT and GNSS.

The BT may include classical BT and Bluetooth Low Energy (BLE).

In some embodiments, the antenna sharing system may further include a first antenna 110, a second antenna 120, a third antenna 130, a fourth antenna 140, a fifth antenna 150 and a sixth antenna 160.

The first antenna 110 is configured to transmit and receive GNSS signals, the second antenna 120 is configured to transmit and receive 2.4 GHz Wi-Fi secondary signals and 5 GHz Wi-Fi secondary signals, the third antenna 130 is configured to transmit and receive 2.4 GHz Wi-Fi primary signals and 5 GHz Wi-Fi primary signals, the fourth antenna 140 is configured to transmit and receive BT signals, the fifth antenna 150 is configured to transmit and receive LTE secondary signals, and the sixth antenna 160 is configured to transmit and receive LTE primary signals.

Inventor of the present disclosure has discovered through research that in the existing techniques, to avoid the use of the time division mechanism, more antennas have to be used to transmit and receive communication signals, and an antenna sharing mechanism merely can be used when a difference between frequency band ranges of signals is relatively large (for example, there is a large difference between frequency band ranges of 2.4 GHz Wi-Fi secondary signals and 5 GHz Wi-Fi secondary signals, and between frequency band ranges of 2.4 GHz Wi-Fi primary signals and 5 GHz Wi-Fi primary signals, and thus an antenna can be shared in these situations), resulting in a relatively large number of antennas and a low utilization rate of antennas.

In the embodiments of the present disclosure, the antenna sharing system includes a communication module that supports 5 GHz Wi-Fi and LTE, and the antenna sharing system further includes: a first antenna; and a first multiplexer including at least two multiplex input terminals and a multiplex output terminal, wherein a first multiplex input terminal of the first multiplexer is configured to transmit and receive 5 GHz Wi-Fi secondary signals, a second multiplex input terminal of the first multiplexer is configured to transmit and receive LTE secondary signals, and the multiplex output terminal of the first multiplexer is connected to the first antenna. In the embodiments, by setting the first multiplexer, the first antenna is shared to transmit and receive 5 GHz Wi-Fi secondary signals and LTE secondary signals. Compared with the existing technique where two antennas are used to transmit and receive LTE primary signals and LTE secondary signals respectively, in the embodiments of the present disclosure, the first antenna can transmit and receive signals other than the LTE secondary signals, which may effectively improve a utilization rate of antennas. Further, a frequency band range of the 5 GHz Wi-Fi secondary signals is quite different from that of the LTE secondary signals, which is helpful to avoid interference caused by antenna sharing and improve effectiveness of signal transmission and reception.

In order to clarify the objects, characteristics and advantages of the disclosure, embodiments of present disclosure will be described in detail in conjunction with accompanying drawings.

Figure 2:
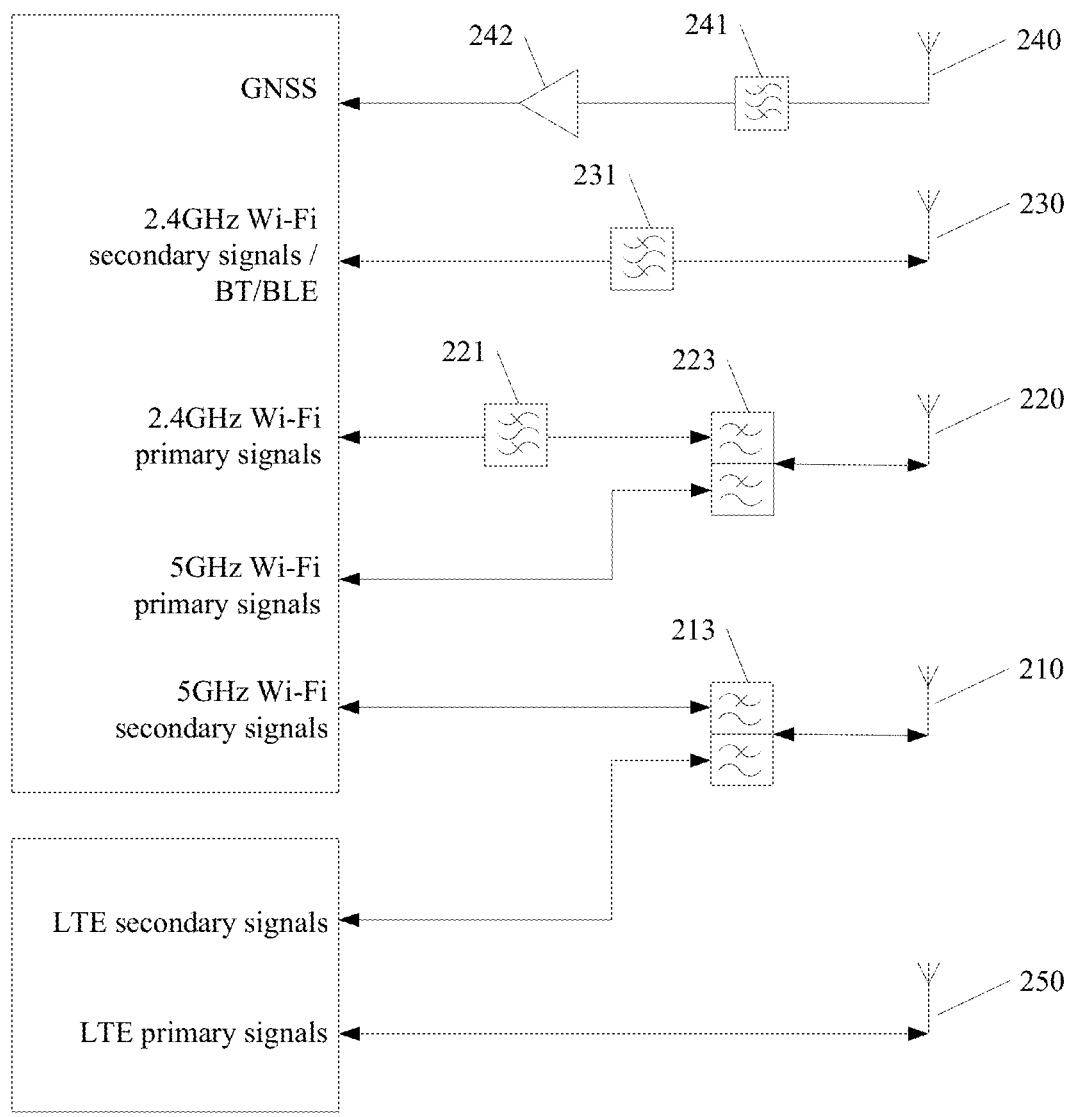
FIG. 2 is a structural diagram of an antenna sharing system according to an embodiment.

FIG. 2 is a structural diagram of an antenna sharing system according to an embodiment.

The antenna sharing system includes a communication module that supports 5 GHz Wi-Fi, 2.4 GHz Wi-Fi, LTE, BT and GNSS, and the BT includes classical BT and BLE.

The antenna sharing system further includes a first antenna 210 and a first multiplexer 213.

The first multiplexer 213 includes at least two multiplex input terminals and a multiplex output terminal, wherein a first multiplex input terminal of the first multiplexer 213 is configured to transmit and receive 5 GHz Wi-Fi secondary signals, a second multiplex input terminal of the first multiplexer 213 is configured to transmit and receive LTE secondary signals, and the multiplex output terminal of the first multiplexer 213 is connected to the first antenna 210.

In the embodiments of the present disclosure, by setting the first multiplexer 213, the first antenna 210 is shared to transmit and receive 5 GHz Wi-Fi secondary signals and LTE secondary signals. Compared with the existing technique where two antennas are used to transmit and receive LTE primary signals and LTE secondary signals respectively, in the embodiments of the present disclosure, the first antenna 210 can transmit and receive signals other than the LTE secondary signals, which may effectively improve a utilization rate of antennas. Further, a frequency band range of the 5 GHz Wi-Fi secondary signals is quite different from that of the LTE secondary signals, which is helpful to avoid interference caused by antenna sharing and improve effectiveness of signal transmission and reception.

In some embodiments, the antenna sharing system further includes a second antenna 220 configured to transmit and receive 5 GHz Wi-Fi primary signals and 2.4 GHz Wi-Fi primary signals.

In some embodiments, the antenna sharing system further includes a filter 221 and a fifth multiplexer 223.

The filter 221 may perform filtering on the 2.4 GHz Wi-Fi primary signals, and further, the filter 221 may be a Surface Acoustic Wave (SAW) filter to better satisfy a filtering demand.

The fifth multiplexer 223 may include at least two multiplex input terminals and a multiplex output terminal, wherein a first multiplex input terminal of the fifth multiplexer 223 is configured to transmit and receive 5 GHz Wi-Fi primary signals, a second multiplex input terminal of the fifth multiplexer 223 is configured to transmit and receive 2.4 GHz Wi-Fi primary signals, and the multiplex output terminal of the fifth multiplexer 223 is connected to the second antenna.

In some embodiments, the antenna sharing system further includes a third antenna 230 configured to transmit and receive at least 2.4 GHz Wi-Fi primary signals and BT signals.

In some embodiments, the antenna sharing system further includes a filter 231.

The filter 231 may perform filtering on the 2.4 GHz Wi-Fi secondary signals and BT signals, and further, the filter 231 may be a SAW filter to better satisfy a filtering demand.

In the above embodiments, the third antenna 230 is shared to transmit and receive 2.4 GHz Wi-Fi secondary signals and BT signals. Compared with the existing technique where a separate antenna is used to transmit and receive BT signals, the above embodiments may reduce the number of antennas.

In some embodiments, the antenna sharing system further includes a fourth antenna 240 configured to transmit and receive GNSS signals.

In some embodiments, the antenna sharing system further includes a filter 241 and an amplifier 242.

The filter 241 may perform filtering on the GNSS signals, and further, the filter 241 may be a SAW filter to better satisfy a filtering demand.

The amplifier 242 may perform amplification on the GNSS signals, and further, the amplifier 242 may be a Low Noise Amplifier (LNA) to better satisfy an amplification demand.

In the embodiments, the fourth antenna 240 is dedicated to transmitting and receiving the GNSS signals, which may maintain GNSS signal requirements in the existing techniques.

In some embodiments, the antenna sharing system further includes a fifth antenna 250 configured to transmit and receive LTE primary signals.

In the above antenna sharing system, five antennas are adopted, which effectively reduces the number of antennas compared with the existing techniques where at least sixth antennas are used.

Figure 3:
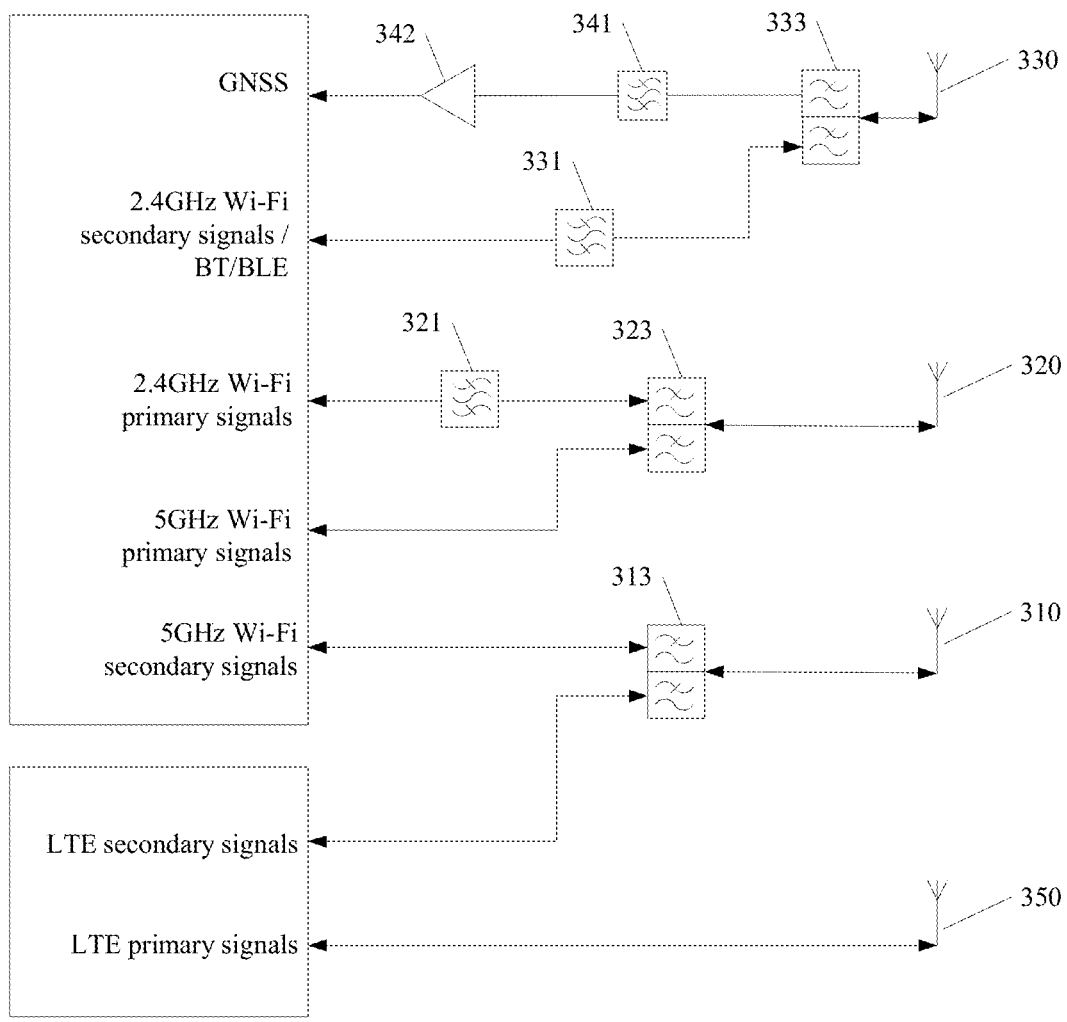
FIG. 3 is a structural diagram of an antenna sharing system according to an embodiment.

FIG. 3 is a structural diagram of an antenna sharing system according to an embodiment. The antenna sharing system includes a communication module that supports 5 GHz Wi-Fi, 2.4 GHz Wi-Fi, LTE, BT and GNSS, and the BT includes classical BT and BLE.

The antenna sharing system may include a first antenna 310, a first multiplexer 313, a second antenna 320, a filter 321, a fifth multiplexer 323 and a fifth antenna 350.

More details about the first antenna 310 and the first multiplexer 313, can be referred to the first antenna 210 and the first multiplexer 213 in FIG. 2, more details about for the second antenna 320, the filter 321 and the fifth multiplexer 323 can be referred to the second antenna 220, the filter 221 and the fifth multiplexer 223 in FIG. 2, and more details of the fifth antenna 350 can be referred to the fifth antenna 250 in FIG. 2, which are not described here.

In some embodiments, the antenna sharing system may further include a third antenna 330 and a second multiplexer 333. The second multiplexer 333 includes at least two multiplex input terminals and a multiplex output terminal, wherein a first multiplex input terminal of the second multiplexer 333 is configured to transmit and receive GNSS signals, a second multiplex input terminal of the second multiplexer 333 is configured to transmit and receive 2.4 GHz Wi-Fi secondary signals and BT signals, and the multiplex output terminal of the second multiplexer 333 is connected to the third antenna 330.

In some embodiments, the antenna sharing system further includes a filter 331, a filter 341 and an amplifier 342.

The filter 331 may perform filtering on the 2.4 GHz Wi-Fi secondary signals and BT signals, and the filter 341 may perform filtering on the GNSS signals.

Further, the filter 331 and the filter 341 may be SAW filters to better satisfy a filtering demand.

The amplifier 342 may perform amplification on the GNSS signals, and further, the amplifier 342 may be an LNA to better satisfy an amplification demand.

In the above embodiments, the second multiplexer 323 is set, and the third antenna 330 is shared to transmit and receive GNSS signals, 2.4 GHz Wi-Fi secondary signals and BT signals. Compared with the existing technique where separate antennas are used to transmit and receive BT signals and GNSS signals respectively, the embodiments of the present disclosure are applicable for situations where requirements on a GNSS function are low and requirements on an LTE function are high, and in the above embodiments, merely 4 antennas are adopted, which further reduces the number of antennas.

Figure 4:
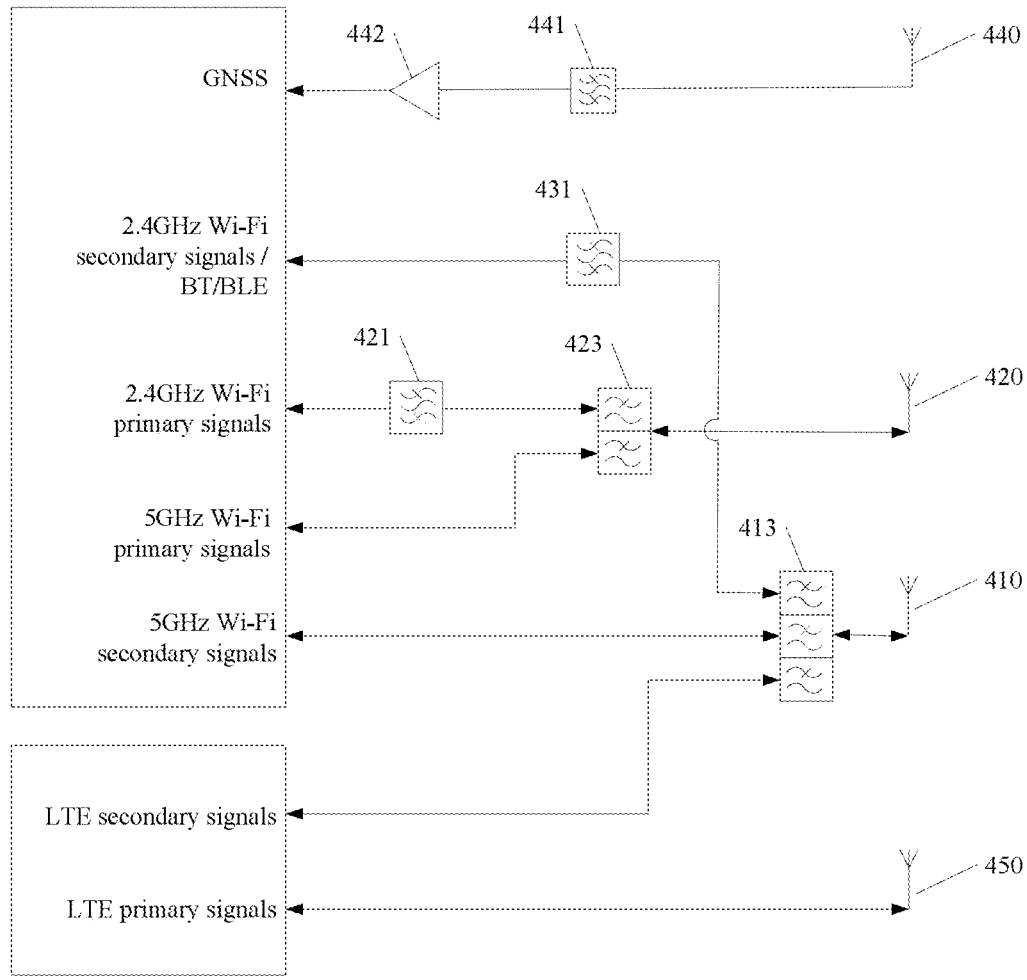
FIG. 4 is a structural diagram of an antenna sharing system according to an embodiment.

Referring to FIG. 4, FIG. 4 is a structural diagram of an antenna sharing system according to an embodiment. The antenna sharing system includes a communication module that supports 5 GHz Wi-Fi, 2.4 GHz Wi-Fi, LTE, BT and GNSS, and the BT includes classical BT and BLE.

The antenna sharing system may include a first antenna 410, a second antenna 420, a filter 421, a fifth multiplexer 423, a fourth antenna 440, a filter 441, an amplifier 442 and a fifth antenna 450.

More details about the first antenna 410 can be referred to the first antenna 210 in FIG. 2, more details about the second antenna 420, the filter 421 and the fifth multiplexer 423 can be referred to the second antenna 220, the filter 221 and the fifth multiplexer 223 in FIG. 2, more details about the fourth antenna 440, the filter 441 and the amplifier 442 can be referred to the fourth antenna 240, the filter 241 and the amplifier 242 in FIG. 2, and more details about the fifth antenna 450 can be referred to the fifth antenna 250 in FIG. 2, which are not described here.

In some embodiments, the antenna sharing system further includes a first multiplexer 413 including at least third multiplex input terminals and a multiplex output terminal, wherein a first multiplex input terminal of the first multiplexer 413 is configured to transmit and receive 5 GHz Wi-Fi secondary signals, a second multiplex input terminal of the first multiplexer 413 is configured to transmit and receive LTE secondary signals, a third multiplex input terminal of the first multiplexer 413 is configured to transmit and receive 2.4 GHz Wi-Fi secondary signals and BT signals, and the multiplex output terminal of the first multiplexer 413 is connected to the first antenna 410.

In the embodiments, the fourth antenna 440 is dedicated to transmitting and receiving the GNSS signals, which may maintain GNSS signal requirements in the existing techniques.

In some embodiments, the antenna sharing system further includes a filter 431. The filter 431 may perform filtering on the 2.4 GHz Wi-Fi secondary signals and BT signals.

Further, the filter 431 may be a SAW filter to better satisfy a filtering demand.

In the above embodiments, the first multiplexer 413 is set as a triplexer, and the first antenna 410 is shared to transmit and receive 5 GHz Wi-Fi secondary signals, LTE secondary signals, 2.4 GHz Wi-Fi secondary signals and BT signals. Compared with the existing technique where separate antennas are used to transmit and receive 2.4 GHz Wi-Fi secondary signals and BT signals respectively, the above embodiments are applicable for situations where requirements on an LTE function are low and requirements on a GNSS function are high, and in the above embodiments, a separate antenna is adopted to transmit and receive GNSS signals, which further reduce the number of antennas.

Figure 5:
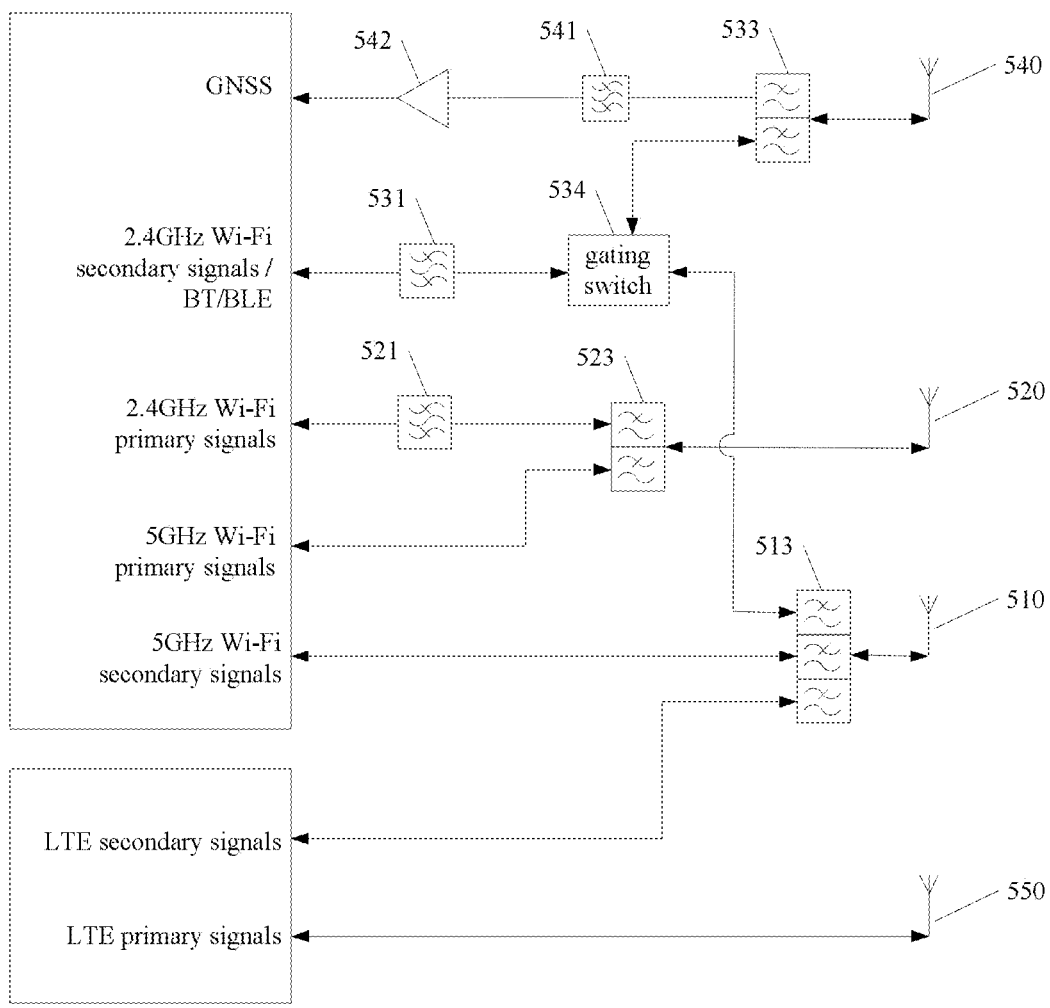
FIG. 5 is a structural diagram of an antenna sharing system according to an embodiment.

Referring to FIG. 5, FIG. 5 is a structural diagram of an antenna sharing system according to an embodiment. The antenna sharing system includes a communication module that supports 5 GHz Wi-Fi, 2.4 GHz Wi-Fi, LTE, BT and GNSS, and the BT includes classical BT and BLE.

The antenna sharing system may include a first antenna 510, a second antenna 520, a filter 521, a fifth multiplexer 523 and a fifth antenna 550.

More details about the first antenna 510 can be referred to the first antenna 210 in FIG. 2, more details about the second antenna 520, the filter 521 and the fifth multiplexer 523 can be referred to the second antenna 220, the filter 221 and the fifth multiplexer 223, and more details about the fifth antenna 550 can be referred to the fifth antenna 250 in FIG. 2, which are not described here.

In some embodiments, the antenna sharing system may further include a first multiplexer 513, a first gating switch 534, a third multiplexer 533 and a fourth antenna 540.

The first gating switch 534 includes a gating input terminal and at least two gating output terminals, wherein the gating input terminal of the first gating switch 534 is connected to a pin for the 2.4 GHz Wi-Fi secondary signals and BT signals on the communication module.

The third multiplexer 533 includes at least two multiplex input terminals and a multiplex output terminal, wherein a first multiplex input terminal of the third multiplexer 533 is connected to a first gating output terminal of the first gating switch 534, a second multiplex input terminal of the third multiplexer 533 is configured to transmit and receive GNSS signals, and the multiplex output terminal of the third multiplexer 533 is connected to the fourth antenna 540.

The first multiplexer 513 includes at least three multiplex input terminals and a multiplex output terminal, wherein a first multiplex input terminal of the first multiplexer 513 is configured to transmit and receive 5 GHz Wi-Fi secondary signals, a second multiplex input terminal of the first multiplexer 513 is configured to transmit and receive LTE secondary signals, a fourth multiplex input terminal of the first multiplexer 513 is connected to a second gating output terminal of the first gating switch 534, and the multiplex output terminal of the first multiplexer 513 is connected to the first antenna 510.

In some embodiments, the first gating switch 534 is selected from a group consisting of a single pole double throw switch and a switcher.

In some embodiments, the antenna sharing system further includes a filter 541 and an amplifier 542.

The filter 541 may perform filtering on the GNSS signals, and further, the filter 541 may be a SAW filter to better satisfy a filtering demand. The amplifier 542 may perform amplification on the GNSS signals, and further, the amplifier 542 may be an LNA to better satisfy an amplification demand.

In some embodiments, the antenna sharing system further includes a filter 531.

The filter 531 may perform filtering on the 2.4 GHz Wi-Fi secondary signals and BT signals, and further, the filter 531 may be a SAW filter to better satisfy a filtering demand.

In the above embodiments, the first gating switch 534, the third multiplexer 533 and the first multiplexer 513 are set as triplexers. When the first gating switch 534 is connected to the fourth antenna 540, the fourth antenna 540 is shared to transmit and receive GNSS signals, 2.4 GHz Wi-Fi secondary signals and BT signals, and when the first gating switch 534 is connected to the fifth antenna 510, the fifth antenna 510 is shared to transmit and receive 5 GHz Wi-Fi secondary signals, LTE secondary signals, 2.4 GHz Wi-Fi secondary signals and BT signals. With these embodiments, the system can flexibly become to any of the systems provided in the above embodiments as shown in FIG. 3 or FIG. 4 via the first gating switch 534, so that users can select the system based on practical requirements on GNSS and LTE functions, which is helpful to improve convenience and enhance user experience.

Figure 6:
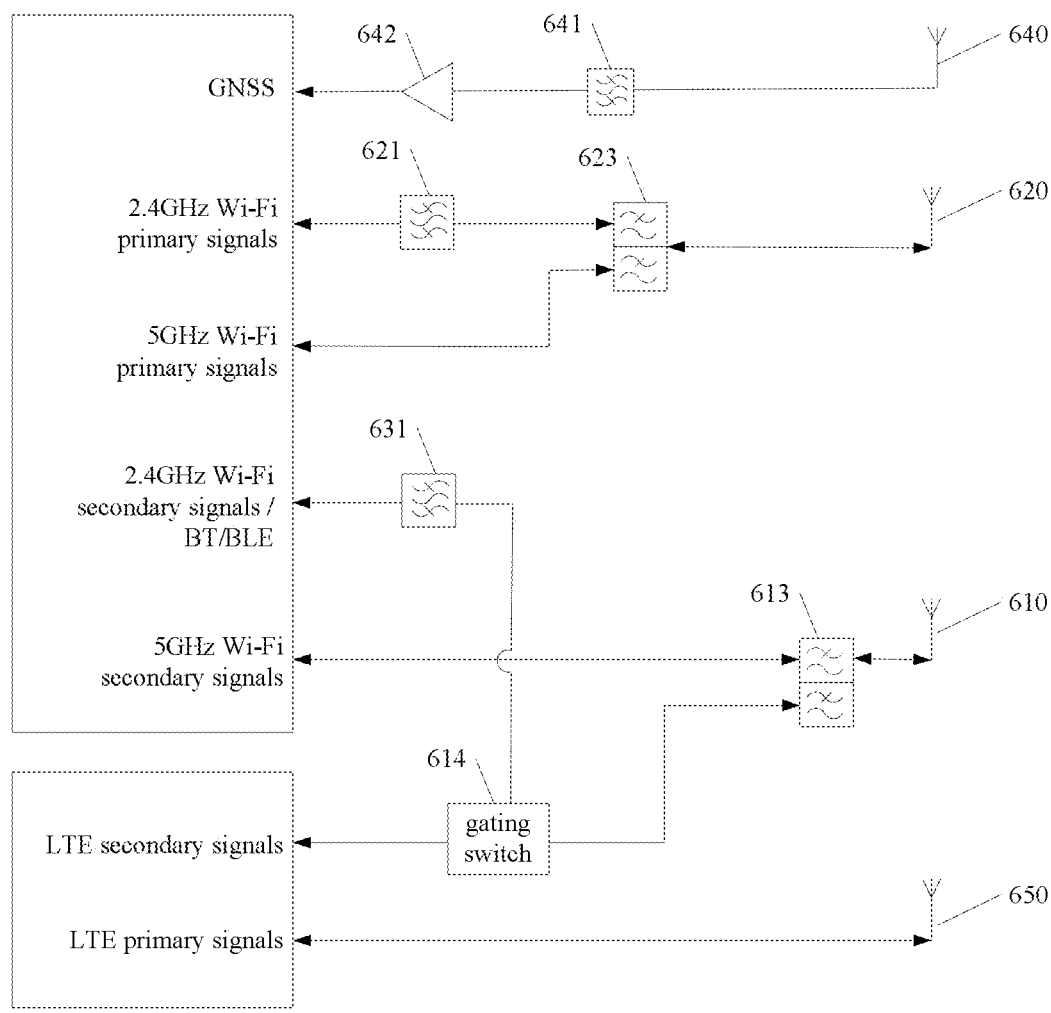
FIG. 6 is a structural diagram of an antenna sharing system according to an embodiment.

Referring to FIG. 6, FIG. 6 is a structural diagram of an antenna sharing system according to an embodiment.

The antenna sharing system includes a first antenna 610, a second antenna 620, a filter 621, a fifth multiplexer 623, a fourth antenna 640, a filter 641, an amplifier 642 and a fifth antenna 650.

More details about the first antenna 610 can be referred to the first antenna 210 in FIG. 2, more details about the second antenna 620, the filter 621 and the fifth multiplexer 623 can be referred to the second antenna 220, the filter 221 and the fifth multiplexer 223 in FIG. 2, more details about the fourth antenna 640, the filter 641 and the amplifier 642 can be referred to the fourth antenna 240, the filter 241 and the amplifier 242 in FIG. 2, and more details about the fifth antenna 650 can be referred to the fifth antenna 250 in FIG. 2, which are not described here.

In some embodiments, the antenna sharing system may further include a second gating switch 614, a filter 631 and a first multiplexer 613.

The second gating switch 614 includes at least two gating input terminals and a gating output terminal, wherein a first gating input terminal of the second gating switch 614 is connected to a pin for the 2.4 GHz Wi-Fi secondary signals and BT signals on the communication module, a second gating input terminal of the second gating switch 614 is connected to a pin for the LTE secondary signals on the communication module, and the gating output terminal of the second gating switch 614 is connected to the second multiplex input terminal of the first multiplexer 613.

The first multiplexer 613 includes at least two multiplex input terminals and a multiplex output terminal, wherein a first multiplex input terminal of the first multiplexer 613 is configured to transmit and receive 5 GHz Wi-Fi secondary signals, a second multiplex input terminal of the first multiplexer 613 is configured to transmit and receive LTE secondary signals, or transmit and receive 2.4 GHz Wi-Fi secondary signals and BT signals, according to the second gating switch 614, and the multiplex output terminal of the first multiplexer 613 is connected to the first antenna 610.

The filter 631 may perform filtering on the 2.4 GHz Wi-Fi secondary signals and BT signals, and further, the filter 631 may be a SAW filter to better satisfy a filtering demand.

In the above embodiments, the second gating switch 614 is set, so that the first antenna 610 can be connected to the 2.4 GHz Wi-Fi secondary signals and BT signals, or be connected to LTE secondary signals, which effectively improves a utilization rate of antennas.

Compared with setting the first multiplexer 413 as a triplexer in the above embodiments as shown in FIG. 4, in these embodiments, a duplexer can be used as the first multiplexer 613, which effectively reduces cost.

Figure 7:
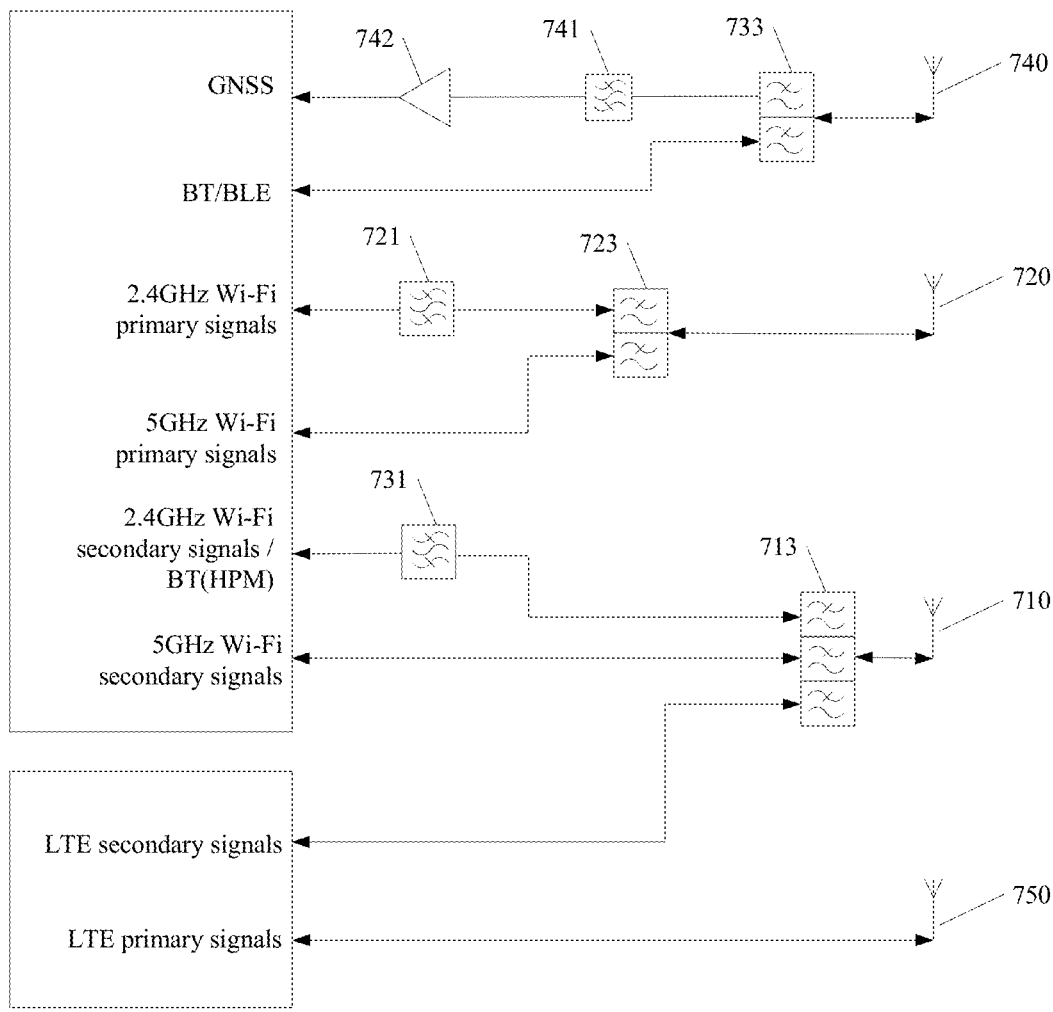
FIG. 7 is a structural diagram of an antenna sharing system according to an embodiment.

Referring to FIG. 7, FIG. 7 is a structural diagram of an antenna sharing system according to an embodiment.

The antenna sharing system includes a first antenna 710, a second antenna 720, a filter 721, a fifth multiplexer 723, a fourth antenna 740, a filter 741, an amplifier 742 and a fifth antenna 750.

More details about the first antenna 710 can be referred to the first antenna 210 in FIG. 2, more details about the second antenna 720, the filter 721 and the fifth multiplexer 723 can be referred to the second antenna 220, the filter 221 and the fifth multiplexer 223 in FIG. 2, more details about the fourth antenna 740, the filter 741 and the amplifier 742 can be referred to the fourth antenna 240, the filter 241 and the amplifier 242 in FIG. 2, and more details about the fifth antenna 750 can be referred to the fifth antenna 250 in FIG. 2, which are not described here.

In some embodiments, the antenna sharing system may further include a first multiplexer 713, a filter 731 and a fourth multiplexer 733.

The fourth multiplexer 733 includes at least two multiplex input terminals and a multiplex output terminal, wherein a first multiplex input terminal of the fourth multiplexer 733 is configured to transmit and receive BT signals, and a second multiplex input terminal of the fourth multiplexer 733 is configured to transmit and receive GNSS signals, and the multiplex output terminal of the fourth multiplexer 733 is connected to the fourth antenna 740.

The first multiplexer 713 includes at least three multiplex input terminals and a multiplex output terminal, wherein a first multiplex input terminal of the first multiplexer 713 is configured to transmit and receive 5 GHz Wi-Fi secondary signals, a second multiplex input terminal of the first multiplexer 713 is configured to transmit and receive LTE secondary signals, a fifth multiplex input terminal of the first multiplexer 713 is configured to transmit and receive 2.4 GHz Wi-Fi secondary signals and BT HPM signals, and the multiplex output terminal of the first multiplexer 713 is connected to the first antenna 710.

The filter 731 may perform filtering on the 2.4 GHz Wi-Fi secondary signals and BT signals, and further, the filter 731 may be a SAW filter to better satisfy a filtering demand.

In the above embodiments, the communication module further supports a BT HPM function. The fourth multiplexer 733 and the first multiplexer 713 are set as triplexers, so that the first antenna 710 is shared for transmitting and receiving 5 GHz Wi-Fi secondary signals, LTE secondary signals, 2.4 GHz Wi-Fi secondary signals and BT HPM signals, and the fourth antenna 740 is shared for transmitting and receiving BT signals and GNSS signals. In this way, the BT HPM function is supported without increasing the number of antennas.

Embodiments of the present disclosure further provide a terminal including any one of the above antenna sharing systems as shown in FIG. 2 to FIG. 7. The terminal may include but is not limited to a terminal device such as a mobile phone, a computer or a tablet, a cloud platform, an Internet of Vehicles server, or an Internet of Things server.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. An antenna sharing system, comprising a communication module that supports 5 GHz Wireless Fidelity (Wi-Fi) and Long Term Evolution (LTE), and the antenna sharing system further comprising:
    a first antenna;
    a first multiplexer comprising at least two multiplex input terminals and a multiplex output terminal, wherein a first multiplex input terminal of the first multiplexer is configured to transmit and receive 5 GHz Wi-Fi secondary signals, a second multiplex input terminal of the first multiplexer is configured to transmit and receive LTE secondary signals, and the multiplex output terminal of the first multiplexer is connected to the first antenna;
    a second antenna configured to transmit and receive 5 GHz Wi-Fi primary signals and 2.4 GHz Wi-Fi primary signals, wherein the communication module further supports 2.4 GHz Wi-Fi; and
    a fifth multiplexer comprising at least two multiplex input terminals and a multiplex output terminal, wherein a first multiplex input terminal of the fifth multiplexer is configured to transmit and receive 5 GHz Wi-Fi primary signals, a second multiplex input terminal of the fifth multiplexer is configured to transmit and receive 2.4 GHz Wi-Fi primary signals, and the multiplex output terminal of the fifth multiplexer is connected to the second antenna.

2. The antenna sharing system according to claim 1, wherein the communication module further supports Bluetooth (BT), and the antenna sharing system further comprises a third antenna configured to transmit and receive at least 2.4 GHz Wi-Fi primary signals and BT signals.

3. The antenna sharing system according to claim 2, wherein the communication module further supports Global Navigation Satellite System (GNSS), and the antenna sharing system further comprises a fourth antenna configured to transmit and receive GNSS signals.

4. The antenna sharing system according to claim 2, wherein the communication module further supports GNSS, and the third antenna is further configured to transmit and receive GNSS signals; and the antenna sharing system further comprises:
    a second multiplexer comprising at least two multiplex input terminals and a multiplex output terminal, wherein a first multiplex input terminal of the second multiplexer is configured to transmit and receive GNSS signals, a second multiplex input terminal of the second multiplexer is configured to transmit and receive 2.4 GHz Wi-Fi secondary signals and BT signals, and the multiplex output terminal of the second multiplexer is connected to the third antenna.

5. The antenna sharing system according to claim 1, wherein the communication module further supports BT, and the first multiplexer further comprises a third multiplex input terminal configured to transmit and receive 2.4 GHz Wi-Fi secondary signals and BT signals.

6. The antenna sharing system according to claim 5, wherein the communication module further supports GNSS, and the antenna sharing system further comprises a fourth antenna configured to transmit and receive GNSS signals.

7. The antenna sharing system according to claim 1, wherein the communication module further supports BT and GNSS,
    the antenna sharing system further comprises:
        a fourth antenna;
        a first gating switch comprising a gating input terminal and at least two gating output terminals, wherein the gating input terminal of the first gating switch is connected to a pin for the 2.4 GHz Wi-Fi secondary signals and BT signals on the communication module; and a third multiplexer comprising at least two multiplex input terminals and a multiplex output terminal, wherein a first multiplex input terminal of the third multiplexer is connected to a first gating output terminal of the first gating switch, a second multiplex input terminal of the third multiplexer is configured to transmit and receive GNSS signals, and the multiplex output terminal of the third multiplexer is connected to the fourth antenna, and the first multiplexer further comprises a fourth multiplex input terminal connected to a second gating output terminal of the first gating switch.

8. The antenna sharing system according to claim 7, wherein the first gating switch is selected from a group consisting of a single pole double throw switch and a switcher.

9. The antenna sharing system according to claim 1, further comprising:
a second gating switch comprising at least two gating input terminals and a gating output terminal, wherein a first gating input terminal of the second gating switch is connected to a pin for the 2.4 GHz Wi-Fi secondary signals and BT signals on the communication module, a second gating input terminal of the second gating switch is connected to a pin for the LTE secondary signals on the communication module, and the gating output terminal of the second gating switch is connected to the second multiplex input terminal of the first multiplexer.

10. The antenna sharing system according to claim 9, wherein the communication module further supports GNSS, and the antenna sharing system further comprises a fourth antenna configured to transmit and receive GNSS signals.

11. The antenna sharing system according to claim 1, wherein the communication module further supports a BT high power mode and GNSS,
the first multiplexer further comprises a fifth multiplexer input terminal configured to transmit and receive 2.4 GHz Wi-Fi secondary signals and BT high power mode signals, and
the antenna sharing system further comprises:
a fourth antenna configured to transmit and receive GNSS signals; and
a fourth multiplexer comprising at least two multiplex input terminals and a multiplex output terminal, wherein a first multiplex input terminal of the fourth multiplexer is configured to transmit and receive BT signals, and a second multiplex input terminal of the fourth multiplexer is configured to transmit and receive GNSS signals, and the multiplex output terminal of the fourth multiplexer is connected to the fourth antenna.

12. A terminal, comprising an antenna sharing system, wherein the antenna sharing system comprises a communication module that supports 5 GHz Wireless Fidelity (Wi-Fi) and Long Term Evolution (LTE), and the antenna sharing system further comprises:
a first antenna;
a first multiplexer comprising at least two multiplex input terminals and a multiplex output terminal, wherein a first multiplex input terminal of the first multiplexer is configured to transmit and receive 5 GHz Wi-Fi secondary signals, a second multiplex input terminal of the first multiplexer is configured to transmit and receive LTE secondary signals, and the multiplex output terminal of the first multiplexer is connected to the first antenna;

a second antenna configured to transmit and receive 5 GHz Wi-Fi primary signals and 2.4 GHz Wi-Fi primary signals, wherein the communication module further supports 2.4 GHz Wi-Fi; and
a fifth multiplexer comprising at least two multiplex input terminals and a multiplex output terminal, wherein a first multiplex input terminal of the fifth multiplexer is configured to transmit and receive 5 GHz Wi-Fi primary signals, a second multiplex input terminal of the fifth multiplexer is configured to transmit and receive 2.4 GHz Wi-Fi primary signals, and the multiplex output terminal of the fifth multiplexer is connected to the second antenna.

13. The terminal according to claim 12, wherein the communication module further supports Bluetooth (BT), and the antenna sharing system further comprises a third antenna configured to transmit and receive at least 2.4 GHz Wi-Fi primary signals and BT signals.

14. The terminal according to claim 12, wherein the communication module further supports BT and GNSS,
the antenna sharing system further comprises:
a fourth antenna;
a first gating switch comprising a gating input terminal and at least two gating output terminals, wherein the gating input terminal of the first gating switch is connected to a pin for the 2.4 GHz Wi-Fi secondary signals and BT signals on the communication module; and
a third multiplexer comprising at least two multiplex input terminals and a multiplex output terminal, wherein a first multiplex input terminal of the third multiplexer is connected to a first gating output terminal of the first gating switch, a second multiplex input terminal of the third multiplexer is configured to transmit and receive GNSS signals, and the multiplex output terminal of the third multiplexer is connected to the fourth antenna, and the first multiplexer further comprises a fourth multiplex input terminal connected to a second gating output terminal of the first gating switch.

15. The terminal according to claim 12, wherein the antenna sharing system further comprises:
a second gating switch comprising at least two gating input terminals and a gating output terminal, wherein a first gating input terminal of the second gating switch is connected to a pin for the 2.4 GHz Wi-Fi secondary signals and BT signals on the communication module, a second gating input terminal of the second gating switch is connected to a pin for the LTE secondary signals on the communication module, and the gating output terminal of the second gating switch is connected to the second multiplex input terminal of the first multiplexer.

16. The terminal according to claim 12, wherein the communication module further supports a BT high power mode and GNSS,
the first multiplexer further comprises a fifth multiplexer input terminal configured to transmit and receive 2.4 GHz Wi-Fi secondary signals and BT high power mode signals, and
the antenna sharing system further comprises:
a fourth antenna configured to transmit and receive GNSS signals; and
a fourth multiplexer comprising at least two multiplex input terminals and a multiplex output terminal, wherein a first multiplex input terminal of the fourth multiplexer is configured to transmit and receive BT signals, and a second multiplex input terminal of the fourth multiplexer is configured to transmit and receive GNSS signals, and the multiplex output terminal of the fourth multiplexer is connected to the fourth antenna.

* * * * *